United States Patent
Bailey et al.

(10) Patent No.: US 6,237,941 B1
(45) Date of Patent: *May 29, 2001

(54) INFLATABLE SIDE AIRBAG CURTAIN MODULE

(75) Inventors: Brian J. Bailey, Sterling Heights; Samuel Wong, Troy; Pongdet P. Wipasuramonton, Rochester; Robert Tobian, New Baltimore, all of MI (US); Jörg Reuter, Niedenhausen; Stefan Jost, Wiesbaden, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/593,310

(22) Filed: Jun. 13, 2000

Related U.S. Application Data

(62) Division of application No. 09/026,571, filed on Feb. 20, 1998, now Pat. No. 6,073,961.

(51) Int. Cl.⁷ .................................................. B60R 21/22
(52) U.S. Cl. ......................................... 280/730.2; 280/729
(58) Field of Search .................................. 280/729, 730.1, 280/730.2, 749, 743.1

(56) References Cited

U.S. PATENT DOCUMENTS

| | | | |
|---|---|---|---|
| 5,316,336 | * 5/1994 | Taguchi et al. | 280/730.2 |
| 5,605,346 | * 2/1997 | Cheung et al. | 280/728.2 |
| 5,778,270 | * 7/1998 | Morisawa | 396/429 |
| 5,884,937 | * 3/1999 | Yamada | 280/730.2 |
| 6,073,961 | * 6/2000 | Bailey et al. | 280/730.2 |
| 6,102,435 | * 8/2000 | Wallner et al. | 280/730.2 |

* cited by examiner

Primary Examiner—Paul N. Dickson
Assistant Examiner—Faye M. Fleming
(74) Attorney, Agent, or Firm—Markell Seitzman

(57) ABSTRACT

A side impact or rollover protection restraint system (20) comprising: an air bag of sufficient length to extend between two pillars of a vehicle, the air bag (22), upon inflation, is of sufficient height to extend from proximate a roof rail (38) of the vehicle to a location generally adjacent the upper torso of a seated occupant such that the inflated air bag will lie between the occupant and a side portion of the vehicle; the system (20) further including a flexible tube (70) having a plurality of distributed openings (72) thereacross to distribute inflation gas to the air bag means (60) for inflating the air bag.

14 Claims, 7 Drawing Sheets

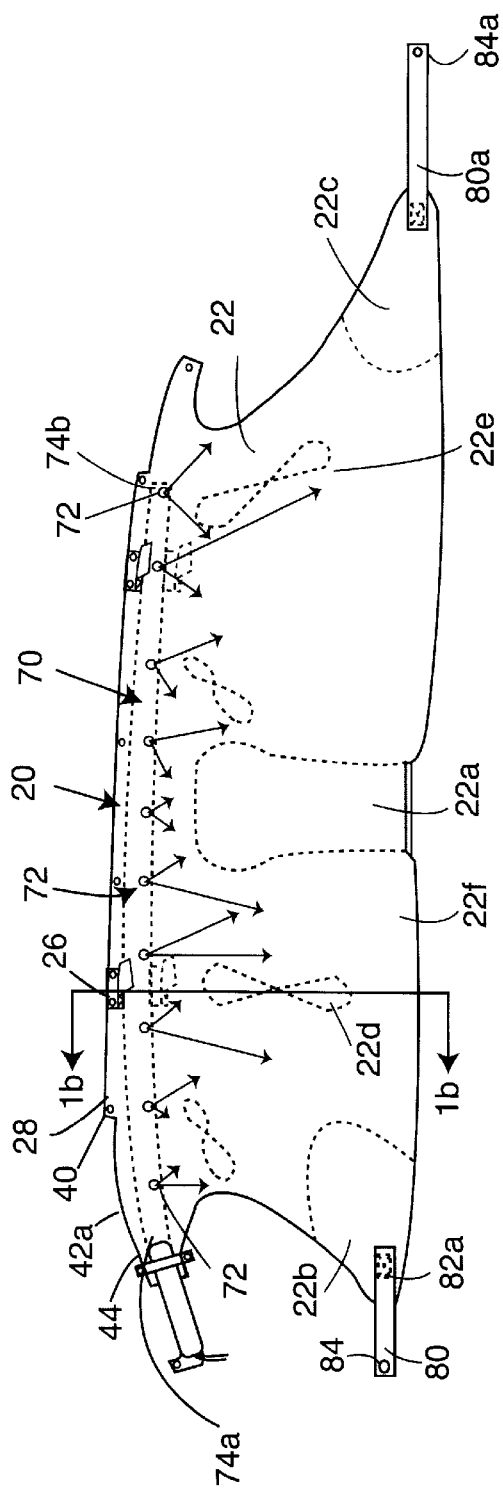
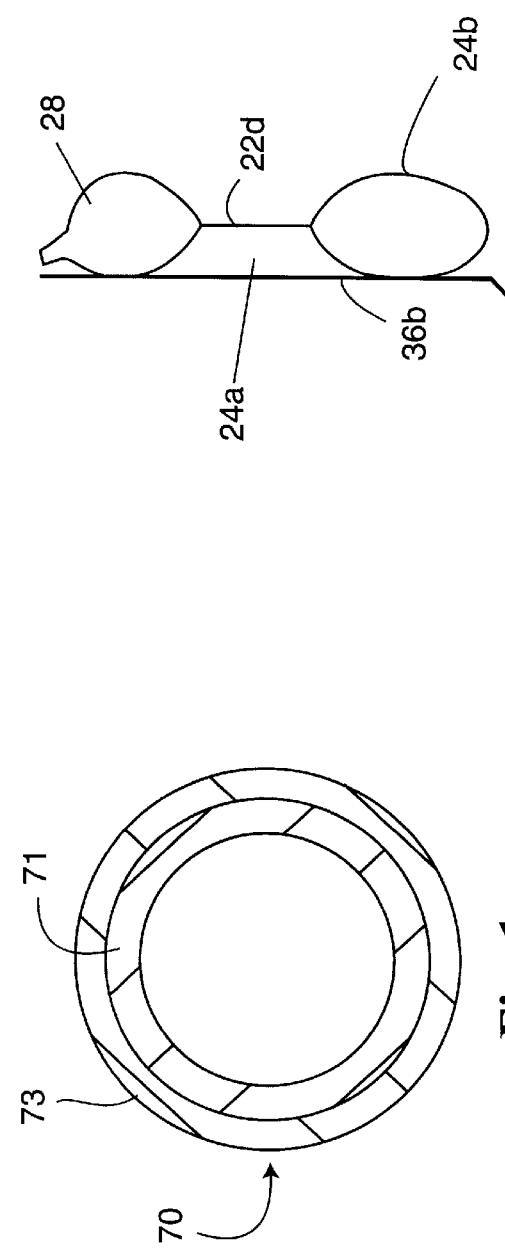
Fig. 1a
Fig. 1b
Fig. 1c

INFLATABLE SIDE AIRBAG CURTAIN MODULE

This application is a division of application Ser. No. 09/026,571, filed Feb. 20, 1998 now U.S. Pat. No. 6,073,961.

BACKGROUND AND SUMMARY OF THE INVENTION

The present invention relates to an inflatable side curtain (or air bag) airbag module assembly designed to provide occupant protection to vehicle passengers during a side impact (crash or collision) or rollover event. More particularly, the module is mounted proximate the vehicle roof rail and concealed by the headliner trim. Upon impact, the curtain (or air bag) deploys between the occupant and intruding object to protect the outboard front and rear occupants.

Accordingly the invention comprises: a side impact or rollover protection restraint system 20 comprising: an air bag of sufficient length to extend from an A-pillar 30 across a B-pillar 32 and be secured proximate a C-pillar 34 of the vehicle, the air bag 22, upon inflation, is of sufficient height to extend from proximate a roof rail 38 of the vehicle to a location generally adjacent the upper torso of a seated occupant such that the inflated air bag will lie between the occupant and a side portion of the vehicle; the system 20 further including a flexible tube 70 having a plurality of distributed openings 72 thereacross to distribute inflation gas to the air bag and means (60) for inflating the air bag.

It is an object of the present invention to provide an air bag or inflatable curtain to protect one or more vehicle occupants in a side impact or roll over crash event.

Many other objects and purposes of the invention will be clear from the following detailed description of the drawings.

BRIEF DESCRIPTION OF THE DRAWINGS

In the drawings:

FIG. 1a illustrates the major components of the present invention.

FIG. 1b shows a cross-sectional view taken through a portion of the air bag of FIG. 1.

FIG. 1c is a cross-sectional view of a tube.

DETAILED DESCRIPTION OF THE DRAWINGS

Figure 2:
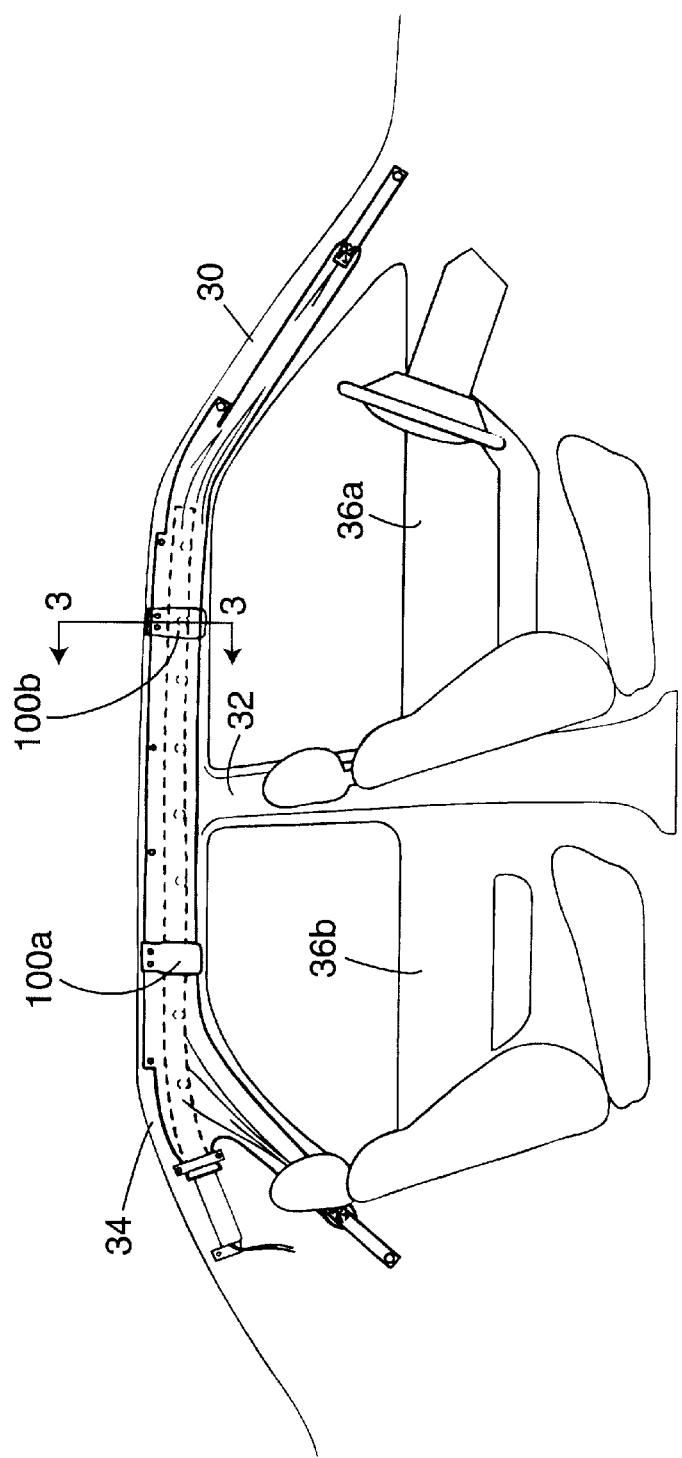
FIG. 2 is a left-hand plan view of the interior of a passenger compartment showing the major components of the present invention.
Figure 4:
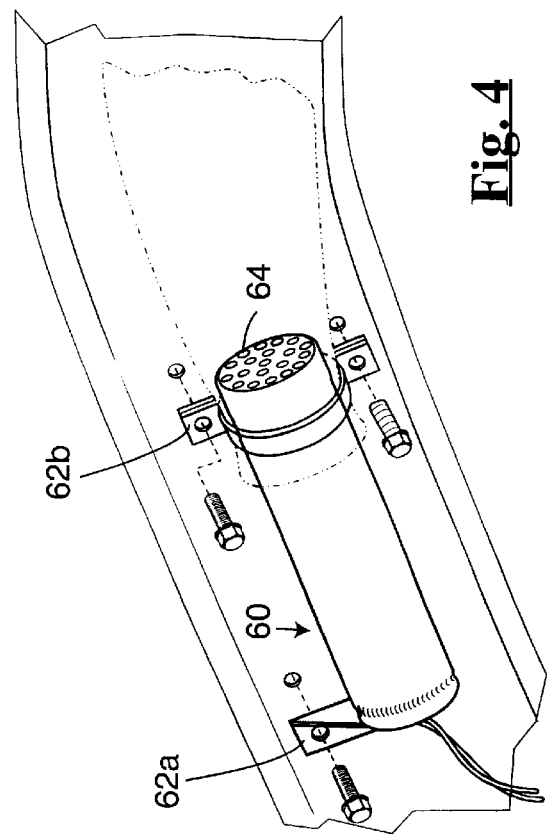
FIG. 4 is an isometric view of an axial flow air bag inflator.
Figure 6:
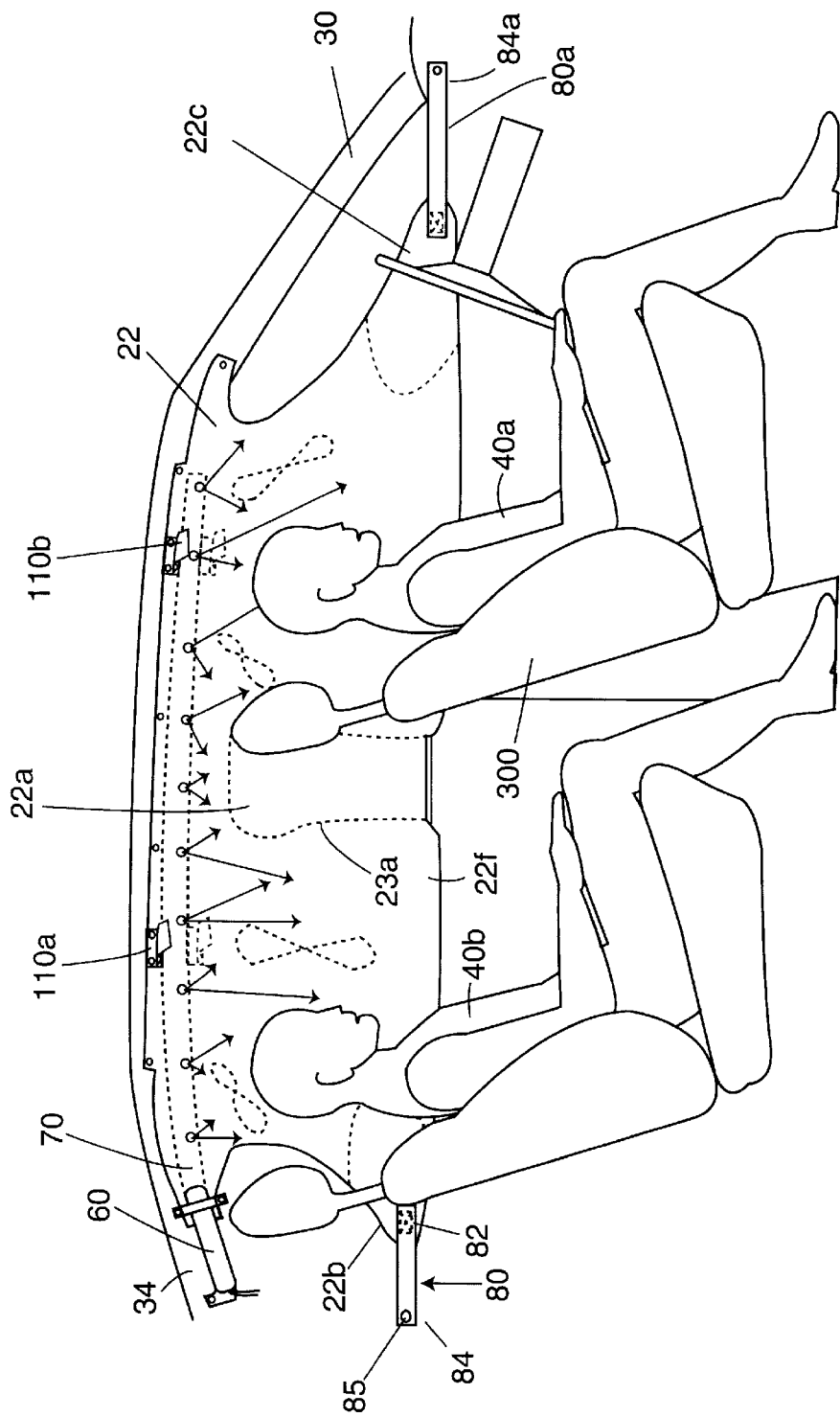
FIG. 6 shows a side curtain or air bag in its deployed state protecting occupants within the passenger compartment.

Reference is now made to FIGS. 1a, 2 and 6. FIG. 1a illustrates a side impact/rollover module generally shown as 20. The module 20 comprises an air bag 22 of sufficient length to extend generally from the vehicle's A-pillar (see FIG. 2) 30 across the B-pillar 32 to the C-pillar 34. The air bag 22 is of sufficient height such that when deployed (as illustrated in FIG. 4) the air bag 22 will lie between the side panels 36a and 36b of the vehicle and the upper torso of the outboard seated occupant, generally shown as 40a and 40b.

Figure 5:
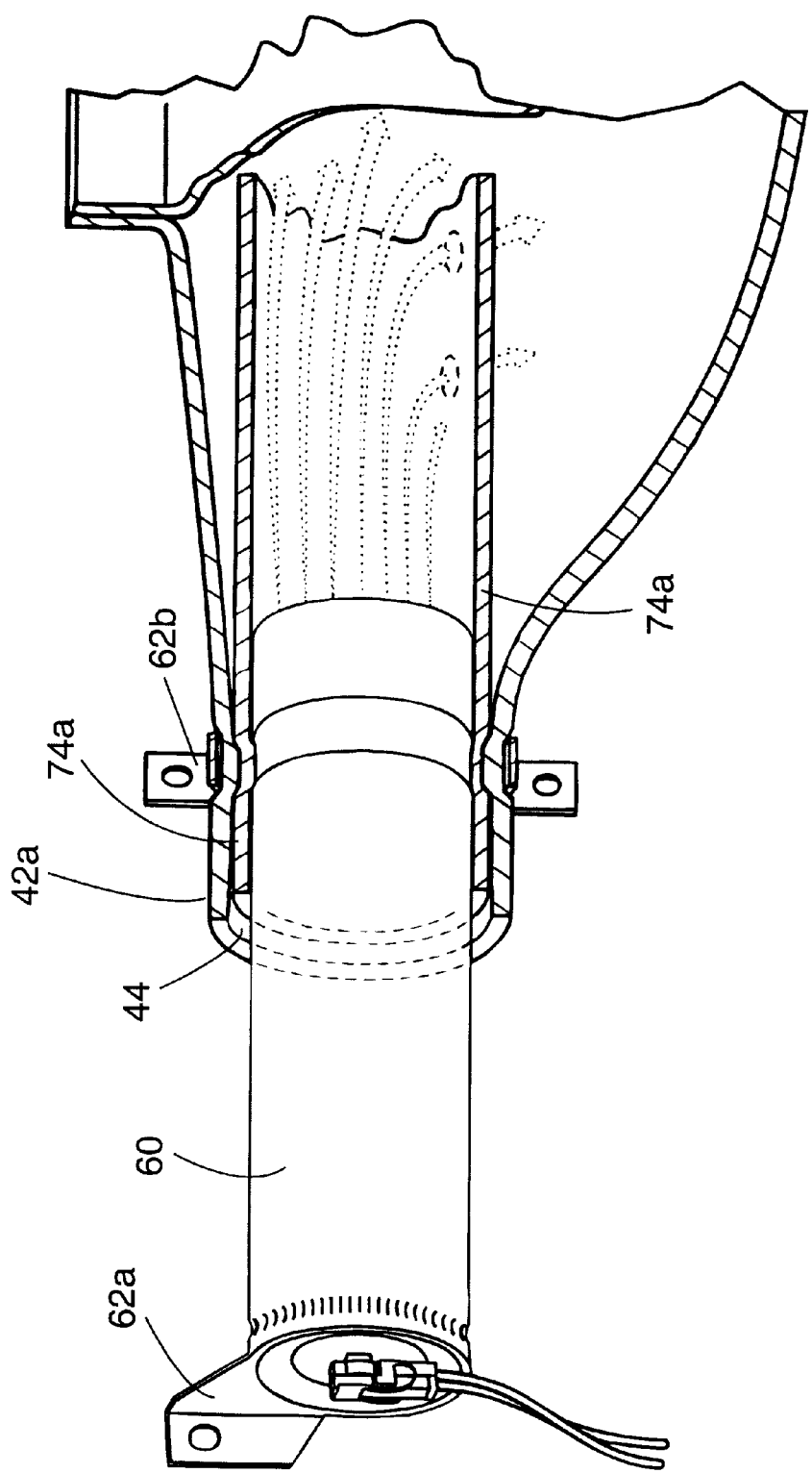
FIG. 5 illustrates the interconnection of the inflator with other components of the invention.

The air bag 22 comprises a plurality of sewn panels 24a and 24b of woven airbag fabric or panels of thermoplastic material that are welded or bonded together. With regard to the fabric, airbag material permeability is chosen to match the required time that the airbag should be inflated. The top 26 of the air bag 22, proximate a joined seam 28 of the panels 24a and b includes a plurality of openings 40. A plurality of fasteners, not shown, are used to secure the top 26 of the air bag 22 to the reinforced roof rail 38 (see FIG. 5). One end, such as the left, rear end 42a of air bag 22, includes an opening 44. Inserted within this opening 44 is an air bag inflator 60 (see FIG. 4). In the embodiment shown, the inflator 60 includes a plurality of mounting brackets or flanges 62a and 62b to permit the inflator 60 to be mounted to an adjacent structural component such as the C-pillar of the vehicle. The inflator 60 may be a solid propellant, hybrid, augmented or liquid inflator of known variety, which upon activation produces or supplies pressurized inflation gas to the air bag 22. In the embodiment illustrated, the inflator 60 includes a plurality of axially oriented output ports 64. Located within the top portion 26 of the air bag 22 is a flexible tube generally shown by numeral 70. In the preferred embodiment of this vehicle, the tube 70 has an elastomeric inner tube 71 with a reinforced outer sheath made of a braided or woven fabric 73, as shown in FIG. 1c. Alternatively, the tube can be made of metal, plastic, rubber or nylon. The tube 70 includes a plurality of openings 72 located thereacross. The tube 70 includes ends 74a and 74b. As can be seen in FIG. 5, end 74a is secured about the inflator 60, by bracket 62b, to permit the inflation gasses to flow directly therein. Opposite end 74b is closed or bonded shut. It should be appreciated that the inflator 60 can be mounted to end 74b which would require that end 74a be similarly closed. In addition, as can be appreciated, upon activation of the inflator 60 inflation gasses will be propelled down the tube 70. Because of the length of the tube 70 the pressure distribution of the inflation gasses will diminish in relation to the distance from inflator 60. Consequently, the openings 72 in the tube 70 may be non-uniformly distributed along the tube such the entire volume of the air bag 22 is inflated relatively simultaneously. As can be seen in FIG. 1a, the distribution of openings 72 is biased toward the closed end 74b of the tube 70, that is the side of the air bag 22 farthest from the inflator 60.

As mentioned above, the air bag 22 comprises a plurality of joined panels such as 24a and 24b. The center of the air bag, such as 22a, which lies approximately near the location of the seat back 300, or alternatively near the D-pillar 32, is bonded or sewn shut so that it will not be inflated.

The bonding or sew line is shown as 23a. As can be appreciated, if the air bag 22 were inflated in this location 22a, it would not provide any measurable degree of occupant protection. The lower left-hand region 22b of the air bag 22 is similarly bonded or sewn together such that it does not inflate. In addition, this area may be reinforced to enable the connection of a tether 80 thereto. One end of the tether, such as 82, is bonded or sewn to section 22b of the air bag while another end 84 of tether 80 is loosely or pivotably secured via a fastener (to a structural portion of the vehicle) which is received through opening 85. Similarly, the forward portion 22c of the air bag 22 is closed so that it does not inflate and a second tether 80a is secured thereto. Similarly, end 84a of tether 80a is secured proximate the lower portion of the A-pillar 30 to permit same to rotate downwardly upon deployment of the air bag 22. Various other locations, such as 22d and 22e, channel the inflation gas to specific inflated lobes or portions of the air bag 22.

Figure 3:
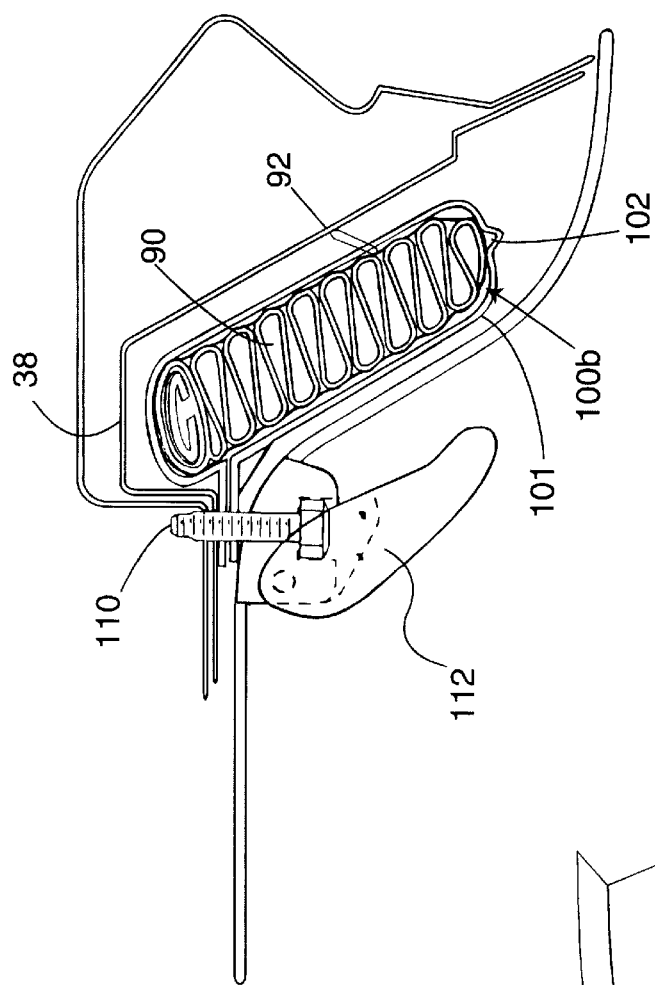
FIG. 3 illustrates a cross-sectional view showing the interconnection of an air bag/cushion in relation to a roof rail.

The lower edge of the air bag 22f is folded upwardly such as into an accordion pleat configuration 90 to achieve the configuration generally shown in FIG. 3. In this configuration, the air bag 22 of FIG. 1 will essentially be formed into a long, cylindrical-like configuration. To keep the air bag in this rolled configuration, the air bag is enveloped in a breakable or tearable material such as shrink-wrap material (cellophane) 92 of a known variety. The folded, enveloped air bag 22 is then secured to the roof rail 38 using a plurality of retainer clips, such as 100a and 100b see FIG. 2), As illustrated in FIG. 3, one of the retainer clips, such as 100b, includes a pre-stressed tear region 102 to permit each clip to open (as illustrated in FIG. 6) upon inflation of the air bag 22. The retainer clips 100a and 100b can be secured by fasteners 110. FIG. 3 shows one such fastener 110 securing clip 100b to the roof rail.

As is known in the art, many vehicles generally above the front and rear doors, include U-shaped grab handles which are utilized to assist the occupant in egressing the vehicle. One such grab handle 112 is illustrated in FIG. 3. The fastener, such as 110, utilized to secure the grab handle to the roof rail can also be utilized to secure the clips 100a and b to the roof rail. As can be appreciated, the number of clips will depend on the individual vehicle. In addition, the folded, enveloped air bag can be placed in a tubular plastic shell having the pre-stressed section 102; in essence the pre-stressed shell can be envisioned as a plurality of contiguous retaining clips 100a,b, etc.

Figure 7:
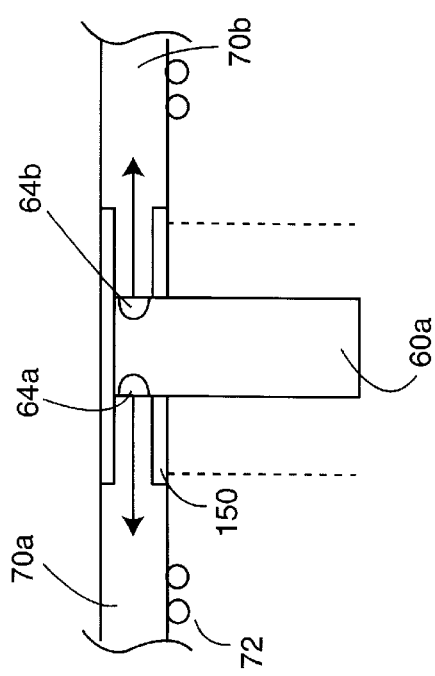
FIGS. 7 and 8 illustrate alternate embodiment of the invention.
Figure 8:
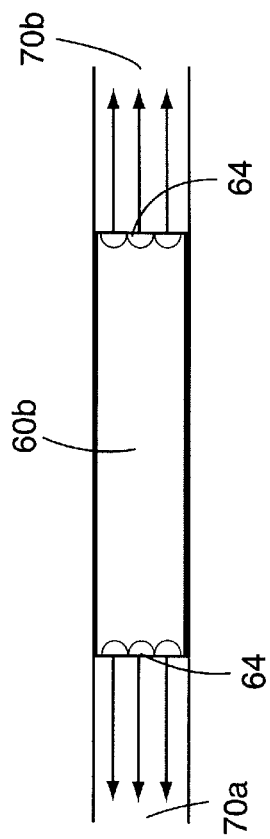

Reference is briefly made to FIG. 7 which illustrates an alternate embodiment of the invention. In this embodiment the inflator 60a is configured such that it comprises at least two exit ports 64a and 64b (opposite to one another). The inflator, using an adapter 150, is secured to opposing sections 70a and 70d of a segmented tube 70. The inflator 60a of FIG. 7 can be fixedly secured to the B-pillar 32 of the vehicle. FIG. 8 illustrates an alternate embodiment of the invention. In this embodiment, the inflator 60b comprises axial flow ports 64 at both of its ends. The inflator is connected to opposing sections 70a and 70b of the segmented tube 70.

Figure 9:
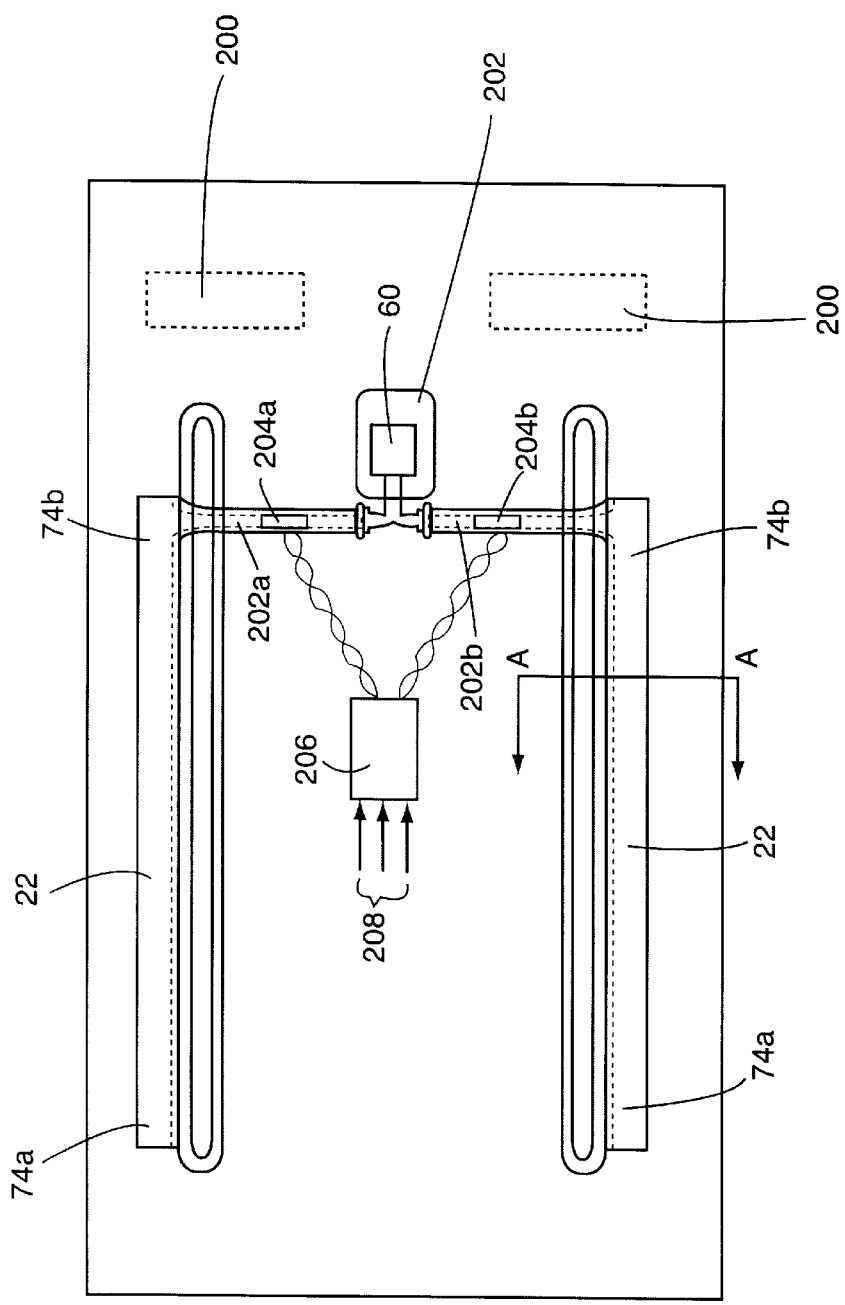
FIG. 9 shows an alternate installation of the present invention.

Reference is briefly made to FIG. 9 which illustrates a further embodiment of the invention. FIG. 9 illustrates a top plan view of a roof of a vehicle. The front windows 200 identify the forward portion of the vehicle. Many vehicles, such as vans and trucks, include a center console 202 located in front of and between the seating locations of the front occupants of the vehicle. Located generally in the area of this console is a central inflator 60 that is communicated via tubes or conduits 202a and 202b to a section proximate the closed end 74b of opposingly situated cushions 22. The opposing end 74a of each of the cushions 22 is enclosed. Situated within each conduit 202a and b is a respective control valve 204a and 204b which is responsive to signals received from a control unit generally shown as 206. The control unit is responsive to input signals 208 received from a plurality of crash sensors located in and about the vehicle. Upon sensing that the vehicle is involved in a crash on one or the other side of the vehicle, or that the vehicle is involved in a rollover, toward one or the other side, the controller 206 activates the inflator 60 and one of the corresponding control valves 204a or 204b to permit inflation gas to flow to one or the other of the air bags 22 on the right or left-hand side of the vehicle in the side impact and/or rollover crash event. Alternatively, and depending upon the capacity of the inflator 60 of FIG. 8, the control unit 206 may simultaneously activate both valves 204a and b which will then deploy both of the air bags 22 on either side of the vehicle such that they achieve the deployed orientation as illustrated in FIG. 6.

Many changes and modifications in the above-described embodiment of the invention can, of course, be carried out without departing from the scope thereof. Accordingly, that scope is intended to be limited only by the scope of the appended claims.

What is claimed is:

1. A side impact or rollover protection restraint system (20) for a vehicle occupant, the vehicle including along a first side thereof a first pillar and a second pillar, the system comprising:

a first air bag of sufficient length to extend from about the position of the first pillar (30) across to and secured proximate the second pillar (34) of the vehicle, the first air bag (22), upon inflation, is of sufficient height to extend from proximate a first roof rail (38) on a first side of the vehicle to a location generally adjacent a shoulder of a seated occupant such that the inflated air bag will lie between the occupant and the first side of the vehicle;

the system (20) further including a first flexible tube (70) having a plurality of distributed openings (72) thereacross to distribute inflation gas to the first air bag wherein the first flexible tube extends substantially across the length of the air bag and inflation means (60) for inflating the air bag.

2. The system as defined in claim 1 wherein the openings are non-uniformly distributed across the length of the first tube such that inflation gas is distributed across the width of the first air bag generally uniformly.

3. The system as defined in claim 1 wherein in a pre-inflation state, the first air bag is folded and encased within a tubular plastic shell, the shell being opened as the first air bag inflates, the shell includes a region having a preferred tear feature.

4. The system as defined in claim 3 wherein the tear feature is located proximate a lower portion of the folded first air bag.

5. The system as defined in claim 1 wherein the inflation means includes at least one exit port coaxially arranged with a longitudinal axis of the tube.

6. The system as defined in claim 1 wherein the tube includes an elastomeric inner tube and a reinforced outer sheath.

7. The system as defined in claim 6 wherein the outer sheath is one of braided and woven material.

8. The system as defined in claim 1 wherein the first air bag is secured to the first roof rail by a break-away clip held to the first roof rail by a fastener and wherein the vehicle also includes a grab handle grasp located near the first roof rail, wherein the same fastener secures both the clip and the grab handle.

9. The system as defined in claim 1 wherein the first tube includes a first and a second portion and wherein the inflation means includes at least two exit ports, a first of the exit ports operatively communicated to the first portion and a second of the exit ports operatively communicated to the second portion.

10. The system as defined in claim 1 wherein the vehicle includes on an opposite side thereof a third pillar and a fourth pillar and a second air bag that extends from about the third pillar to about the fourth pillar, and wherein the inflation means is communicated to both the first and to the second air bag.

11. The system as defined in claim 10 further including a first control valve means, communicated between the inflation means and the first air bag, for regulating the flow of inflation gas to the first air bag and a second control valve means communicated between the inflation means and the second air bag, for regulating the flow of inflation gas to the second air bag.

12. The system as defined in claim 11 wherein the inflation means is located in a forward roof portion of the vehicle.

13. A side impact or rollover protection restraint system (20) for a vehicle occupant, the vehicle including along a first side thereof a first pillar and a second pillar, the system comprising:

a first air bag of sufficient length to extend from about the position of the first pillar (30) across to and secured proximate the second pillar (34) of the vehicle, the first air bag (22), upon inflation, is of sufficient height to extend from proximate a first roof rail (38) on a first side of the vehicle to a location sufficient to protect a seated occupant such that the inflated air bag will lie between the occupant and the first side of the vehicle; and inflation means (60) for providing inflation gas to the air bag;

wherein the vehicle includes on an opposite side thereof a third pillar and a fourth pillar and a second air bag that extends from about the third pillar to about the fourth pillar, and second inflation means for providing inflation gas to the second air bag.

14. A side impact or rollover protection restraint system (20) for a vehicle occupant, the vehicle including along a first side thereof a first pillar and a second pillar, the system comprising:

a first air bag of sufficient length to extend from about the position of the first pillar (30) across to and secured proximate the second pillar (34) of the vehicle, the first air bag (22), upon inflation, is of sufficient height to extend from proximate a first roof rail (38) on a first side of the vehicle to a location sufficient to protect a seated occupant such that the inflated air bag will lie between the occupant and the first side of the vehicle;

the system (20) further including a first flexible tube (70) having a plurality of distributed openings (72) thereacross to distribute inflation gas to the first air bag wherein the first flexible tube extends substantially across the length of the air bag and inflation means (60) for inflating the air bag.

* * * * *